UNITED STATES PATENT OFFICE.

ROBERT R. TAYLOR, OF READING, PENNSYLVANIA.

IMPROVEMENT IN COMPOUNDS FOR REMOVING SCALE FROM BOILERS.

Specification forming part of Letters Patent No. 181,373, dated August 22, 1876; application filed May 29, 1876.

*To all whom it may concern:*

Be it known that I, ROBERT R. TAYLOR, of Reading, county of Berks, and State of Pennsylvania, have invented an Improvement in Compounds for Removing Scale from Boilers, of which the following is a specification:

The object of my invention is to remove scale from steam-boilers, and prevent the formation of all insoluble deposits.

My invention is a compound consisting of the following ingredients, viz: five pounds chestnut-oak bark, half pint honey, two ounces washing-soda, one quart extract sumac, one quart extract Irish moss, and one quart extract slippery-elm to two gallons of water.

What I claim as my invention, and desire to secure by Letters Patent, is—

A compound, consisting of five pounds chestnut-oak bark, half pint honey, two ounces washing-soda, one quart extract sumac, one quart extract Irish moss, and one quart extract slippery-elm to two gallons water, as and for the purpose set forth.

ROBERT R. TAYLOR.

Witnesses:
 JOHN M. SHARP,
 CYRUS J. HUNTER.